United States Patent
Eslambolchi et al.

[11] Patent Number: 5,994,904
[45] Date of Patent: *Nov. 30, 1999

[54] METHOD AND APPARATUS FOR MONITORING THE RELATIVE POSITION OF A CABLE BORING HEAD DURING A BORING OPERATION

[75] Inventors: Hossein Eslambolchi, Basking Ridge, N.J.; John Sinclair Huffman, McDonough, Ga.

[73] Assignee: AT&T Corp, New York, N.Y.

[ * ] Notice: This patent is subject to a terminal disclaimer.

[21] Appl. No.: 08/939,141

[22] Filed: Sep. 29, 1997

[51] Int. Cl.$^6$ .............................. G01R 19/00; G01V 3/08; G01V 3/10
[52] U.S. Cl. .................. 324/326; 324/67; 175/45
[58] Field of Search .................. 324/326, 66, 67, 324/228, 232, 327, 329, 541, 543, 544; 175/40, 45, 50, 62

[56] References Cited

U.S. PATENT DOCUMENTS

| | | | |
|---|---|---|---|
| 5,644,237 | 7/1997 | Eslambolchi et al. | 324/326 |
| 5,757,190 | 5/1998 | Mercer | 324/326 |
| 5,798,644 | 8/1998 | Eslambolchi et al. | 324/326 |

*Primary Examiner*—Jay Patidar
*Attorney, Agent, or Firm*—Robert B. Levy

[57] ABSTRACT

To more accurately detect the position of a boring head (16) relative to a utility conveyance (22) during a boring operation, the conveyance carries a low power, pulsed signal. The signal is detectable only with a limited distance from the conveyance corresponding to a minimum allowable distance between the boring head and the conveyance. The boring head (16) carries at least one detector (28) for detecting the signal radiated by the cable. If the detector (28) detects the signal, then the boring head is too close and boring operation is interrupted.

15 Claims, 1 Drawing Sheet

METHOD AND APPARATUS FOR MONITORING THE RELATIVE POSITION OF A CABLE BORING HEAD DURING A BORING OPERATION

TECHNICAL FIELD

This invention relates to a technique for monitoring the relative position of a cable boring head during a boring operation in the vicinity of one or more existing underground utility conveyances.

BACKGROUND ART

Utilities often bury their conveyances (i.e., pipes and/or cables) underground for reasons of safety and aesthetics. Usually, the environment and terrain dictate the type of method employed for burying such conveyances. In rural areas, utilities prefer direct burial which they accomplish by plowing or trenching the earth. In urban environments, and when crossing waterways, boring is preferred. To accomplish such boring, the utility, or a contractor under its employ, first excavates a pit at each of the opposite ends of the intended route for the conveyance. From the first pit, a boring (auger) machine forces a boring head horizontally through the earth into the second pit to create a tunnel through which a utility conveyance may be routed.

Underground utility conveyance burial by boring does create a certain risk. An operator must carefully control the path of the boring head to avoid contact between the boring head and one or more existing underground utility conveyances buried in proximity to the path created by the boring head. For this reason, many utilities, such as AT&T, have regulations governing the minimum allowable distance permitted between the boring head and an existing underground utility conveyance. To facilitate control of the boring head, most boring head manufacturers provide a transmitter (hereinafter referred to as a "sonde") in the boring head for transmitting a signal in the range of 33 Hz. to 9 kHz. The signal transmitted by the sonde radiates through the ground and is detected by one or more receivers located above ground. By monitoring the signal radiated by the sonde in the boring head, the operator of the boring machine can determine the relative position of the boring head as it bores a path through the earth to control the boring head to avoid contact with an existing underground utility conveyance.

Unfortunately, the signal radiated by the sonde in the boring head tends to induce electromagnetic signals in other facilities, such as other underground utility conveyances. The receiver(s) tuned to receive the signal radiated by the sonde also receive the those signals induced in such other facilities, causing confusion regarding the actual position of the boring head. Since many boring operations occur in the vicinity of existing underground utility conveyances, an error in determining the relative position of the boring head can prove disastrous. Indeed, boring operations have damaged existing underground conveyances, leading to service outages and lost revenues, not to mention the cost associated with repairs.

Thus, a need exits for accurately monitoring the position of a boring head during a boring operation to determine its position relative to an existing underground utility conveyance.

BRIEF SUMMARY OF THE INVENTION

Briefly, the present invention relates to a technique for determining the position of a boring head of a boring machine relative to an existing underground utility conveyance during a boring operation. To more accurately determine the position of the boring head relative to the existing conveyance, the conveyance carries a pulsed, low frequency (e.g., near DC level) signal indicative of the entity maintaining the conveyance. Thus, for example, the signal carried by a buried cable maintained by a telecommunications provider, such as AT&T, possesses a pulsed pattern unique to that provider. The pulsed signal has a limited range, being detectable only within close proximity to the conveyance, typically 6" (~15.24 cm) on each side, and approximately 12" (~30.48 cm) on the top and bottom of the conveyance. The boring head carries at least one detector for detecting the pulsed signal once the boring head is sufficiently close to the existing conveyance so as to be in range of the pulsed signal. Should one or more of the detectors on the boring head detect the presence of the pulsed signal on the conveyance, then the boring machine interrupts the boring operation to prevent damage to the existing underground conveyance.

By impressing a unique pulsed signal on an existing conveyance of interest, and by detecting that signal via at least one detector on the boring head, the operator of the boring machine can accurately monitor the position of the boring relative to the existing conveyance. In this way, the likelihood of damage to the existing conveyance during a boring operation will be reduced.

DETAILED DESCRIPTION

Figure 1:
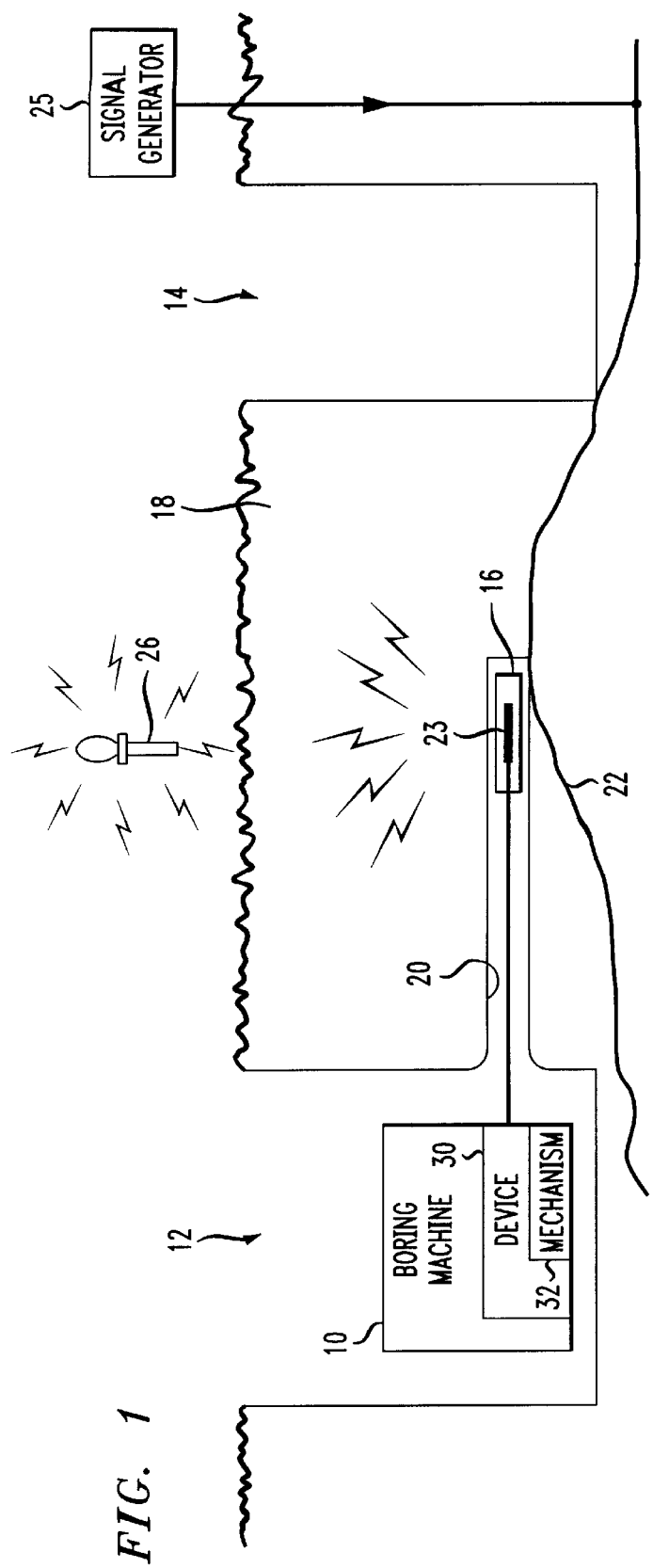
FIG. 1 illustrates a schematic diagram illustrating a boring operation for burying an underground utility conveyance.

FIG. 1 depicts a boring operation conducted with the aid of a boring machine 10 known in the art. To complete a boring operation, a utility, such as AT&T, or its contractor, excavates a first and second bore pits 12 and 14 at opposite ends of an intended path for a conveyance (not shown). Thereafter, the utility or contractor places a boring (auger) machine 10, in the first pit 10. An operator (not shown) operates the machine 10 to force a boring head 16 horizontally through that portion of the ground 18 between the boring pits 12 and 14. Once the boring machine 10 forces the boring head through the earth 18 from the first pit 12 into the second pit 14, a horizontal channel 20 now exists through which the utility conveyance may pass.

Figure 2:
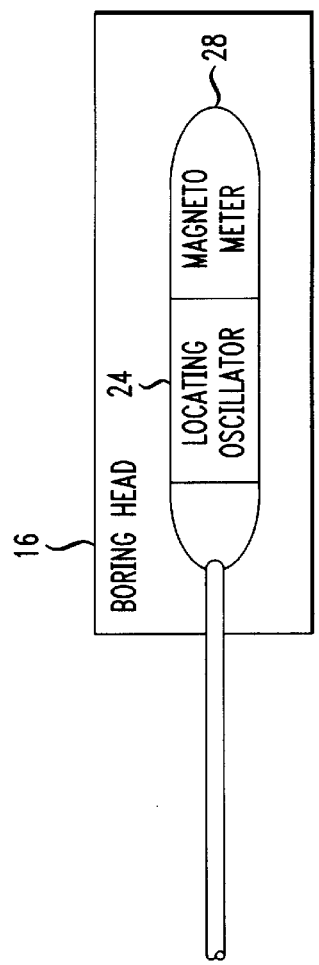
FIG. 2 illustrates a schematic diagram showing a boring head configured in accordance with the teachings of the invention.

Often, a boring operation of the type described occurs in the vicinity of an existing conveyance 22, such as a fiber-optic cable for example. Since the boring operation occurs "blind," that is, without the ability to visually monitor the path of the boring head 16, the boring head may accidentally contact the fiber-optic cable 22, potentially damaging it. Presently, to monitor the path of the boring head 16, the boring head 23 includes a sonde (transmitter) 23 containing a local oscillator 24 (see FIG. 2) that radiates a signal in the range of 33 Hz. to 9 kHz. One or more cable alert detectors 26 (see FIG. 1), placed above the earth 18, monitor the signal radiated by the oscillator in sonde 23 to provide an indication of the relative position of the boring head 16.

In practice, the signal radiated by the sonde 23 induces a like signal in other facilities, e.g., the existing underground utility conveyances, such as fiber-optic cable 22. As a result, the receiver(s) 26 receive the signal induced in such other facilities along with the signal radiated by the oscillator 24 in the sonde 23. As a consequence, the receiver(s) 26 may not accurately determine the relative position of the boring head 16. Not knowing the relative position of the boring head 16 can prove disastrous, especially when the boring operation occurs in close proximity to existing utility conveyances, such as the fiber-optic cable 22.

In accordance with the invention, a technique is provided for more accurately determining the position of the sonde 23 relative to an existing underground utility conveyance, such as the fiber-optic cable 22. To achieve more accurate determination of the position of the boring head 16 relative to the fiber-optic cable 22, the cable carries a unique, relative low frequency (near DC level) pulsed signal on its sheath (not shown). A signal generator 25, typically maintained by the same entity as that responsible for the fiber-optic cable 22 provides the impressed on the cable sheath. The signal impressed on the cable 22 typically comprises a 32-bit pattern that uniquely identifies the entity responsible for maintaining the cable. Thus, a fiber-optic cables 22 owned by AT&T possesses a pulse pattern unique to AT&T. The 32-bit pulsed signal radiated by the fiber-optic cable 22 purposely possesses limited power, thus having a limited range. Typically, the 32-bit signal radiated by the fiber-optic cable 22 is detectable not more than 6 inches (~15.24 cm) from each side, and not more than approximately 12" (~30.48 cm) from the top and bottom of the cable. These distances generally correspond to the minimum allowable spacing of the boring head 16 from the fiber-optic cable 22 during a boring operation.

To detect the signal radiated by the fiber-optic cable 22, the boring head 16 (see FIG. 2) carries at least one detector 28, typically a magnetometer, for detecting the pulsed signal radiated by the cable 22. An electrical indicating device 30, typically carried by the boring machine of FIG. 1, determines the level of the signal (if any) detected by the magnetometer 28 of FIG. 2. Advantageously, the device 30 may also provides an aural and/or visual indication of the signal strength. From the signal strength determination (and indication, if provided), the operator of the boring machine 10 of FIG. 1 can know the position of the boring head 16 relative to the fiber-optic cable 22. As discussed, the pulsed signal radiated by the fiber-optic cable 22 has a very limited range, corresponding to the minimum allowable spacing of the boring head 16 from the fiber-optic cable 22 during a boring operation. Thus, if the operator of the boring machine 10 detects the pulsed signal radiated by the fiber-optic cable 22, then the operator knows the boring head is too close. Accordingly, the operator must suspend the boring operation. If desired, the indicating device 30 may include a mechanism 32 for providing a visual and/or aural warning when the boring head 16 becomes too close to the fiber-optic cable 22.

The above-described technique overcomes the disadvantage of the prior art. Since the signal radiated by the fiber-optic cable 22 has limited range, the signal does not readily induce signals in other facilities (e.g., other buried conveyances). Thus, the technique yields a more accurate determination of the position of the boring head 16 relative to the fiber-optic cable, thereby reducing the likelihood of damage during boring.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for accurately monitoring the position of a boring head relative to a buried utility conveyance during a boring operation in the vicinity of the conveyance, comprising the steps of:

impressing on the conveyance a pulsed, lower power signal whose pulse pattern is unique to an owner of the conveyance; the signal being detectable within a limited distance from the conveyance corresponding to a minimum allowable distance between the boring head and the conveyance;

detecting, via at least one detector carried by the boring head, whether the signal is present; and interrupting movement of the boring head upon detection of the signal.

2. The method according to claim 1 wherein the detecting step includes the steps of:

measuring how strong the pulsed signal is; and providing an indication of the signal strength.

3. The method according to claim 2 wherein visual indication of the signal strength is provided.

4. The method according to claim 1 wherein a aural indication of the signal strength is provided.

5. The method according to claim 1 further including the step of generating a warning when the boring head becomes too close to the conveyance.

6. The method according to claim 5 wherein the warning is generated aurally.

7. The method according to claim 5 wherein the warning is generated visually.

8. Apparatus for more accurately determining the position of a boring head relative to an existing buried utility conveyance during a boring operation in the vicinity of the conveyance, comprising:

means for impressing a pulsed, low-power, low frequency signal on the buried utility conveyance whose pulse pattern is unique to an owner of the conveyance such that the signal radiates a limited distance from the conveyance corresponding to a minimum allowable distance between the boring head and the conveyance;

means carried by the boring head for detecting if the signal is present; and means associated with the detector for determining how strong the signal is to determine whether the boring head is to close to the buried conveyance.

9. The apparatus according to claim 8 wherein the signal impressed on the utility conveyance is a 32-bit signal.

10. The apparatus according to claim 8 wherein the detecting means comprises a magnetometer.

11. The apparatus according to claim 8 wherein the signal strength determining means provides a visual indication of the signal strength.

12. The apparatus according to claim 8 wherein the signal strength determining means provides an aural indication of the signal strength.

13. The apparatus according to claim 8 further including means for generating a warning when the boring head becomes too close to the utility conveyance.

14. The apparatus according to claim 13 wherein the warning generating means provides an aural warning.

15. The apparatus according to claim 13 wherein the warning generating means provides a visual warning.

* * * * *